(12) United States Patent
Yasuhara et al.

(10) Patent No.: US 9,102,218 B2
(45) Date of Patent: Aug. 11, 2015

(54) VEHICLE DOOR STRUCTURE

(71) Applicant: HONDA MOTOR CO., LTD., Tokyo (JP)

(72) Inventors: Shigeto Yasuhara, Wako (JP); Shingo Segawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/247,403

(22) Filed: Apr. 8, 2014

(65) Prior Publication Data
US 2014/0217771 A1 Aug. 7, 2014

Related U.S. Application Data

(62) Division of application No. 13/148,593, filed as application No. PCT/JP2010/000065 on Jan. 7, 2010, now Pat. No. 8,727,420.

(30) Foreign Application Priority Data

Feb. 11, 2009 (JP) .................................. 2009-029207
Feb. 11, 2009 (JP) .................................. 2009-029208

(51) Int. Cl.
*B60J 5/04* (2006.01)

(52) U.S. Cl.
CPC .............. *B60J 5/0444* (2013.01); *B60J 5/0426* (2013.01); *B60J 5/0431* (2013.01); *B60J 5/0436* (2013.01); *B60J 5/0443* (2013.01)

(58) Field of Classification Search
CPC ............ B60R 19/34; B60R 2021/0023; B60R 21/013; B60R 19/18; B60R 2019/186; B62D 21/152; B62D 25/2036; B62D 25/082; B62D 25/2018; B62D 25/20; B62D 25/025; B62D 25/087

USPC ............. 296/146.6, 146.7, 146.5, 146.2, 152; 49/502, 352

See application file for complete search history.

(56) References Cited

U.S. PATENT DOCUMENTS 3,782,036 A * 1/1974 Clark et al. ..................... 49/502
3,964,208 A * 6/1976 Renner et al. .................. 49/502

(Continued)

FOREIGN PATENT DOCUMENTS

| JP | 2000-71769 | 3/2000 |
| JP | 2002-347441 | 12/2002 |

(Continued)

OTHER PUBLICATIONS

Japanese Office Action, Application No. 2010-550424, dated Jun. 27, 2013, 3 pages.

(Continued)

*Primary Examiner* — Glenn Dayoan
*Assistant Examiner* — Sunsurraye Westbrook
(74) *Attorney, Agent, or Firm* — Rankin, Hill & Clark LLP

(57) ABSTRACT

The frontal crash load is transmitted from a front pillar to a center pillar in a reliable manner so that a bending moment caused by the frontal crash load is favorably supported, and the deformation of the door is avoided. A beam member attached to an inner panel includes a S shaped cross section member. An upper channel section of the S shaped cross section member extends along the lower edge of a window opening, and a lower channel section extends adjacent to and in parallel to the lower edge of a window opening in a rear part of the door and is offset toward a lower part of the vehicle body in a rear part of the door, with a front end being located at a same elevation as an upper door hinge.

9 Claims, 10 Drawing Sheets

(56) References Cited

U.S. PATENT DOCUMENTS

| | | | |
|---|---|---|---|
| 4,411,103 A * | 10/1983 | Ohmura et al. | 49/502 |
| 5,505,024 A | 4/1996 | DeRees et al. | |
| 5,555,677 A | 9/1996 | DeRees et al. | |
| 5,600,931 A | 2/1997 | Jonsson | |
| 5,785,376 A * | 7/1998 | Nees et al. | 296/146.6 |
| 5,813,718 A * | 9/1998 | Masuda et al. | 296/146.6 |
| 5,887,938 A * | 3/1999 | Topker et al. | 296/187.12 |
| 6,640,500 B1 | 11/2003 | Stout | |
| 6,663,169 B2 | 12/2003 | Gehringhoff et al. | |
| 6,817,652 B2 | 11/2004 | Graber et al. | |
| 6,869,130 B2 | 3/2005 | Bodin et al. | |
| 7,399,021 B2 | 7/2008 | Katou et al. | |
| 7,451,630 B2 | 11/2008 | Tjoelker et al. | |
| 8,418,408 B2 | 4/2013 | Yasuhara et al. | |

FOREIGN PATENT DOCUMENTS

| | | |
|---|---|---|
| JP | 2005-126018 | 5/2005 |
| JP | 2006-021744 | 1/2006 |
| JP | 2006-321266 | 11/2006 |
| JP | 3989373 | 10/2007 |
| JP | 2007-331584 | 12/2007 |

OTHER PUBLICATIONS

International Search Report, International Application No. PCT/JP2010/000065, dated Apr. 20, 2010, 2 pages.

\* cited by examiner

VEHICLE DOOR STRUCTURE

TECHNICAL FIELD

The present invention relates to a vehicle door structure, and in particular to a side door structure incorporated with a countermeasure against a frontal crash or a side crash event.

PRIOR ART

Typically, a vehicle door structure used as a side door comprises an outboard outer panel and an inboard inner panel. As reinforcement, the vehicle door structure is fitted with a reinforcement beam called as door beam having a front end attached to a front part of the inner panel, and a rear end connected to a rear part of the inner panel, and extending in the fore and aft direction of the vehicle body. Various forms of door beams have been proposed such as a steel channel member defining a box-shaped cross section jointly with the inner panel, a beam member having a dual-top hat shaped cross section, and a pipe member. See patent documents 1, 2 and 3.

The door beam having any of the aforementioned cross sections can function as a load path member in the fore and aft direction of the door so that in the event of a frontal crash, the impact load of the crash (fore and aft load) can be transmitted from a front pillar (A pillar) to a center pillar (B pillar) preventing the deformation of the door as well as the door opening of the vehicle body. Also, in the event of a side crash, the impact load of the crash can be absorbed by a collapsing deformation (plastic deformation) of the cross section of the reinforcement beam, and the deformation of the inner space of the cabin can be avoided.

PRIOR ART DOCUMENT

Patent Document

[Patent document 1] Japanese Patent No. 3989373B
[Patent document 2] Japanese Laid Open Patent No. 2005-126018A
[Patent document 3] Japanese Laid Open Patent No. 2006-021744A

BRIEF SUMMARY OF THE INVENTION

Tasks to be Accomplished by the Invention

The reinforcement beam for the side door, in particular the front side door is required to be able to transmit the frontal crash load from the front pillar to the center pillar in an appropriate manner, serves as a reaction force member for supporting a bending moment created around the connecting part between the lower end of the front pillar lower member and the front end of the side sill at the time of a frontal crash, absorbs the impact load at the time of a side crash by a collapsing deformation of the cross section thereof, and does not prevent the placement of various components within the internal space of the door such as a window regulator.

Even when a reinforcement beam is incorporated in the side door, if the side door and the front pillar deform laterally as a result of a rearward deformation of the front pillar due to a frontal crash load, the reinforcement beam may be unable to effectively perform its function, and fully serve as a load path member for transmitting a frontal crash load from the front pillar to the center pillar.

In view of such problems of the prior art, a primary object of the present invention is to allow a reinforcement beam (beam member) provided in a side door to transmit a frontal crash load from the front pillar to the center pillar in an appropriate manner, to serve as a reaction force member for appropriately supporting the bending moment created around the connecting part between the lower end of the front pillar lower member and the front end of the side sill at the time of a frontal crash, and to absorb a side impact load by a collapsing deformation of the cross section, without obstructing the layout of component parts such as a window regulator within the internal space of the door defined between the outer panel and the inner panel.

A second object of the present invention is to avoid the lateral shifting between the side door and the front pillar to be caused by a frontal crash load, and to allow the reinforcement beam to perform its function as designed in an efficient manner at the time of a frontal crash.

Means to Accomplish the Tasks

To achieve such objects, the present invention provides a vehicle door structure comprising an outer panel disposed on an outboard side of the door structure, an inner panel disposed on an inboard side of the door structure and a hinge allowing the door structure to be opened and closed with respect to the vehicle body, an upper part of the door structure defining a door window opening, the door structure further comprising: a beam member attached to an upper part of the inner panel so as to extend in a fore-and-aft direction, and including a pair of channel sections each having a C-shaped cross section with a convex side thereof facing sideways and vertically joined to each other in a mutually reversed relationship so as to defined an S shaped cross section; wherein the upper channel section has an upper edge adjoining and extending in parallel with a lower edge of the window opening, and the lower channel section extends substantially in parallel with the lower edge of the window opening in a rear end portion thereof and is offset to a lower part of the door structure in a front part thereof, a front end of the lower channel section being located at an elevation overlapping with the hinge.

Effect of the Invention

According to the vehicle door structure of the present invention, as the beam member is not provided with a closed cross section, but comprises a S shaped cross section member, the beam member is able to fully collapse into a flat state without leaving any uncollapsed part when subjected to a side crash load. Thereby, the energy of the side crash can be effectively absorbed. As the upper C shaped channel section of the S shaped cross section member of the beam member extends along the lower edge of the window opening, the upper C shaped channel section is located significantly away from the center of the bending moment caused by a frontal crash. Thereby, the upper C shaped channel section is enabled to support the bending moment of the frontal crash with a minimum reaction force, and the deformation of the door structure can be avoided in a reliable manner. A hinge is attached to a pillar located immediately ahead of the door, and the hinge creates a relatively stiff part owing to the property thereof and/or the property of the surrounding part. (This pillar consists of an A pillar provided in a front end part of the passenger compartment when the door consists of a front door, and a B pillar provided in an intermediate part of the passenger compartment when the door consists of a rear door.) Therefore, by placing the front part of the lower C shaped channel section at a same elevation as the hinge that connects the vehicle door to the vehicle body at the front end of the door, the frontal crash load can be directly transmitted from the hinge to the beam member as a fore and aft axial force so that the frontal crash load can be favorably transmitted to the rear part of the vehicle body by the beam member serving as a load path member, and the deformation of the door structure can be avoided.

In particular, the convex side of the upper channel section may face outboard while the convex side of the lower channel section faces inboard, and a rear part of the lower channel section may be smoothly connected to a front part of the lower channel section via a vertically slanting section thereof. Thereby, as compared with the case where the lower channel section extends horizontally at the same elevation as the hinge, the internal space of the door that is required for receiving various component parts such as a window regulator can be maximized, and the freedom in the layout of component parts in the door can be increased.

According to a particularly preferred embodiment of the present invention, the upper channel section has a bottom wall which is vertically enlarged in a front part of the door structure, an access hole being passed through the enlarged bottom wall for providing an access to a skin mounted door mirror.

Furthermore, if an engagement portion is provided in a front end of the door structure at a part aligning with the beam member, and a corresponding engagement portion is provided in a front pillar opposing the front end of the door structure so as to restrict an outboard displacement of the door structure at the time of a frontal crash by cooperating with the engagement portion of the door structure, as the frontal crash load causes the engagement portion of the door structure to be brought into engagement with the corresponding engagement portion of the pillar on the side of the vehicle body at a part aligning with the beam member along the fore and aft direction, and this constrains the inner panel to the vehicle body pillar, the vehicle door structure (inner panel) and the vehicle body pillar are prevented from moving relative to each other at a part adjacent to the beam member at the time of a frontal crash. Thereby, the reinforcement beam is ensured to function as designed in a both efficient and effective manner.

According to a particularly preferred embodiment of the present invention, the engagement portion of the door structure comprises a projecting member, and the corresponding engagement portion of the front pillar comprises an opening configured to receive the projecting member. In this case, the projecting member may be provided on a part of the inner panel bent toward the front end of the door structure. If a nut member is attached to the bent part of the inner panel, and the projecting member comprises a head of a threaded bolt threaded into a threaded hole of the nut member, the assembly work can be simplified. To prevent the intrusion of foreign matters and moisture into the hole for receiving the projecting member, and the impairment of the external appearance, the vehicle door structure may further comprise a closure member that normally closes the opening, and drops off when the projecting member is received in the opening.

DETAILED DESCRIPTION OF THE PREFERRED EMBODIMENT(S)

An embodiment of the vehicle door structure of the present invention will now be described in the following with reference to FIGS. 1 to 6.

Figure 1:
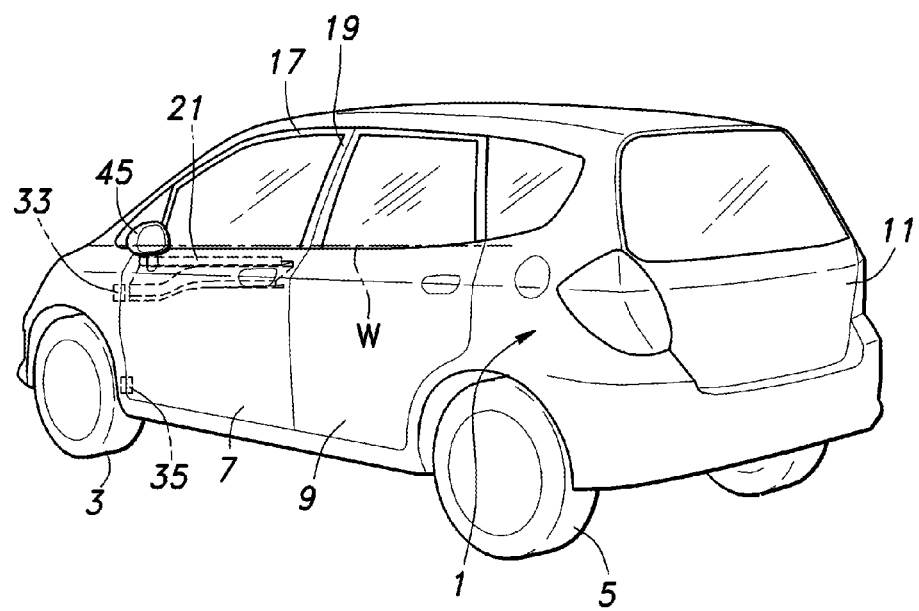
FIG. 1 is a perspective view of a motor vehicle incorporated with a vehicle door structure according to an embodiment of the present invention.
Figure 2:
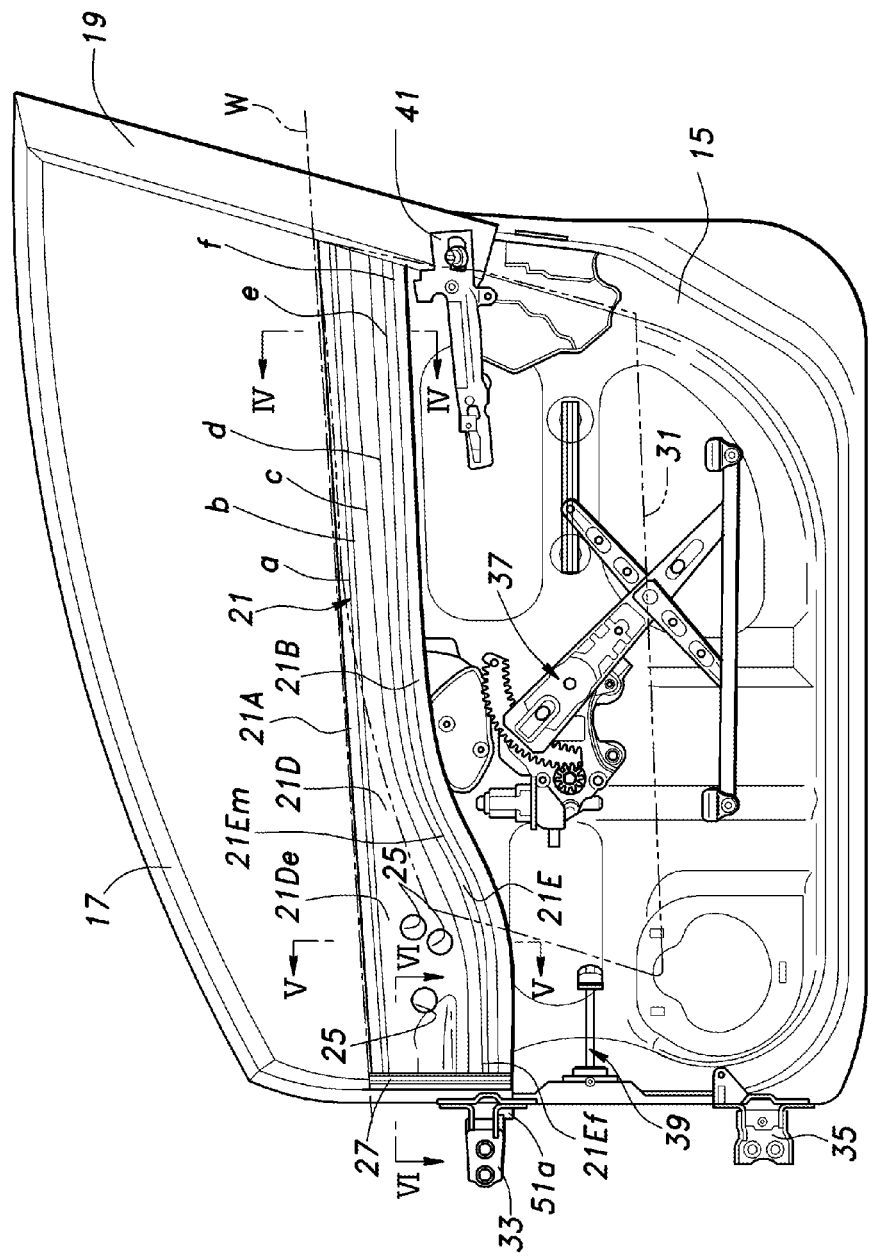
FIG. 2 is a plan view of the vehicle door structure as seen from outside.
Figure 3:
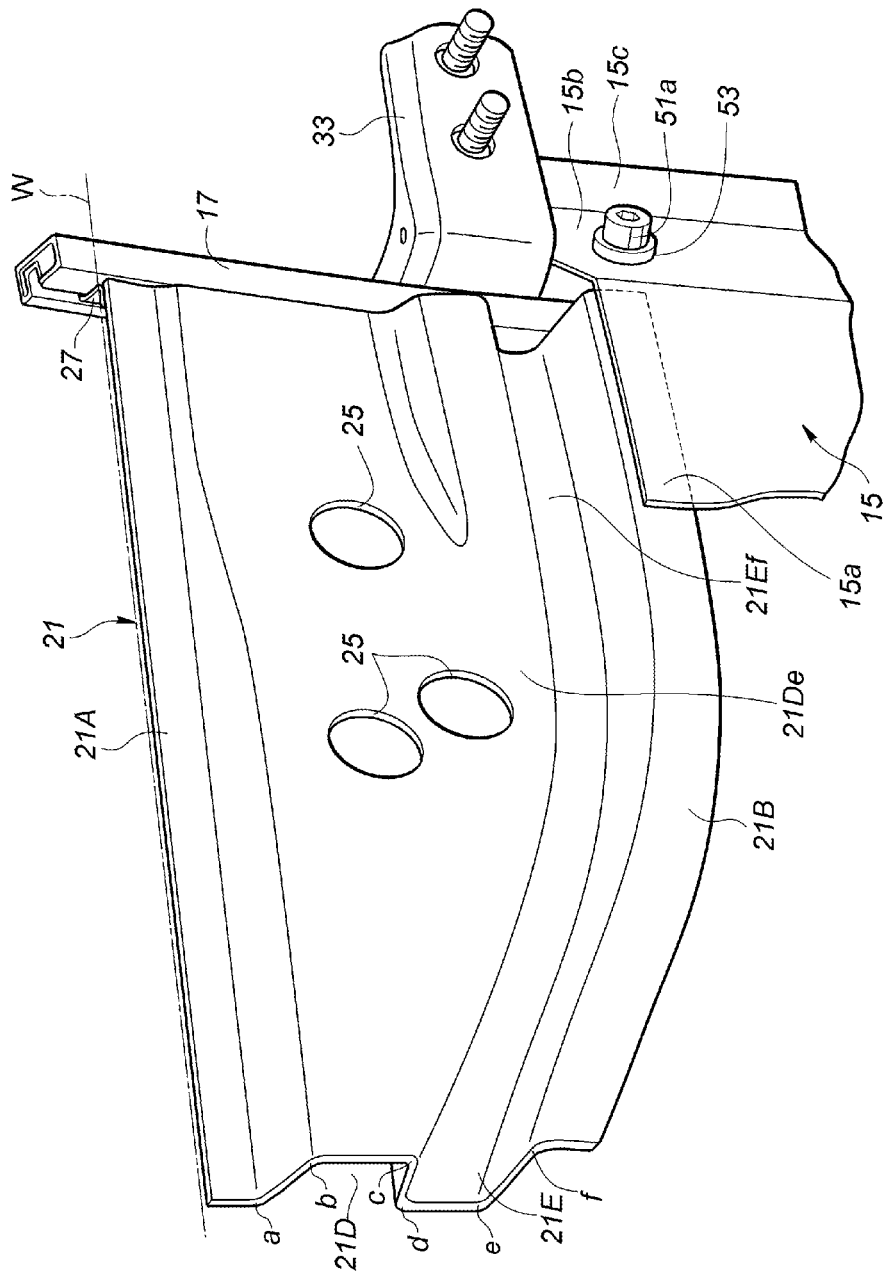
FIG. 3 is an enlarged perspective view of an essential part of the vehicle door structure as seen from inside.

FIG. 1 is a view of a motor vehicle incorporated with a vehicle door structure embodying the present invention. In FIG. 1, numeral 1 denotes a vehicle body 1, numeral 3 denotes front wheels, numeral 5 denote rear wheels, numeral 7 denotes front side doors 7, numeral 9 denotes rear side doors 9, and numeral 11 denotes a tailgate.

The vehicle door structure of the present invention is applied to the front side door 7 in the illustrated embodiment, but can be applied to either the front side door 7 or the rear side door 9.

A shown in FIGS. 2-6, the front side door 7 comprises an outboard outer panel 13, an inboard inner panel 15, and a door sash 17 attached to an upper part of the inner panel 15 and defining a door window opening 19 jointly with the inner panel 15. The outer panel 13 and inner panel 15 are formed by stamp forming steel sheet, and a door internal space 23 is defined between the outer and inner panels 13 and 15.

The front side door 7 is attached to an A-pillar lower member 111 (FIG. 8) via an upper hinge 33 and a lower hinge 35 which are attached to the front edges of the door sash 17 and the inner panel 15, respectively, so as to allow the door to be opened and closed as required.

A plate surface (an outboard plate surface) of the inner panel 15 facing the door internal space 23 supports a window regulator 37 for moving up and down a glass windshield 31, a door checker 39 for limiting the opening angle of the door, and a door lock device 41.

To the upper edge part of the inner panel 15 is attached a beam member 21 extending in the fore and aft direction over the entire length of the inner panel 15.

The beam member 21 comprises an uppermost edge part 21A extending vertically with a uniform vertical dimension and extending in the fore and aft direction at a same elevation, a lower connecting part 21B extending vertically with a uniform vertical dimension and extending in the fore and aft direction with a rear end up slant, and an S shaped cross section member 21C extending in the fore and aft direction between the uppermost edge part 21A and the lower connecting part 21B.

The S shaped cross section member 21C is formed by vertically joining a pair of rectangular C shaped channel members having open ends thereof facing mutually opposite lateral directions. In other words, the S shaped cross section member 21C includes an upper C shaped channel section 21D having a concave side facing laterally outward and a lower C shaped channel section 21E having a concave side facing laterally inward in a mutually inverted relationship which are continuously connected to each other one above the other.

The S shaped cross section member 21C is provided with six bent ridge lines a to f including the connecting lines of the upper most edge part 21A and the lower connecting part 21B.

The upper part of the upper C shaped channel section 21D or the bent ridge line a between the upper C shaped channel section 21D and the uppermost edge part 21A, and the bent ridge line b between the upper side and the bottom side of the upper C shaped channel section 21D extends along the lower edge W of the window opening 19 and with a slight downward slant toward the inboard side of the door structure. In the illustrated embodiment, the lower edge W of the window opening 19 is substantially horizontal, and is defined by the upper edge of the upper most edge part 21A.

The vertical bottom side of the upper C shaped channel section 21D is vertically enlarged in a front part thereof, and thereby defines an enlarged bottom 21De. The enlarged bottom 21De is formed with a plurality of access holes 25 for assembly work. One of the access holes 25 provides an access from inside the passenger compartment when attaching a skin mount side mirror 45 onto the outer panel 13 of the front side door 7 (see FIG. 1). As the access holes 25 are provided in the enlarged bottom 21De, the bent ridge lines a to f are not interrupted by any of the bent ridge lines a to f.

Therefore, the lower C shaped channel section 21E extends adjacent to and in parallel with the lower edge W of the door window opening in a rear part thereof, and slants downward toward the front in a front part thereof owing to the fact that the bottom of the upper C shaped channel section 21D is enlarged in width in the front part thereof. Owing to this slanting, the front end 21Ef of the lower C shaped channel section 21E is located at a same elevation as the upper door hinge 33. In other words, the rear part and front part of the lower C shaped channel section 21E are smoothly connected by a vertically slanted curved section 21Em.

The lower connecting part 21B is provided with a uniform vertical dimension so that the lower connecting part 21B extends in parallel with the lower edge W of the door window opening in the rear part thereof, and is offset downward by means of a curved section in the front part thereof similarly as the lower C shaped channel section 21E.

The beam member 21 is MIG welded to the connecting part 15A to the upper end of the inner panel 15 at the lower connecting part 21B thereof, MIG welded to the front part of the door sash 17 via a bracket 27 at the front end thereof, and MIG welded to the rear part of the door sash 17 at the rear end thereof. Thereby, the beam member 21 is firmly attached to the inner panel 15 and door sash 17 at three sides thereof or the lower, front and rear sides thereof.

The inner panel 15 is made narrower than the vertical width of the door main body by the vertical width of the beam member 21, or, in other words, the beam member 21 is attached to the upper end of the inner panel 15 so as to make up for the reduced vertical width of the inner panel 15. Thereby, the upper end of the inner panel 15 consists solely of the beam member 21, and the lower edge W of the door window opening 19 is defined by the upper edge of the uppermost edge part 21A of the beam member 21.

The front end of the inner panel 15 defines a slanted end surface 15b by bending the material of the inner panel 15 toward the rear surface 111a of the A pillar lower member 111 by a certain angle. The free end of the end surface 15b is bent back or bent forward so as to form a connecting portion 15c for the outer panel 13.

Figure 7:
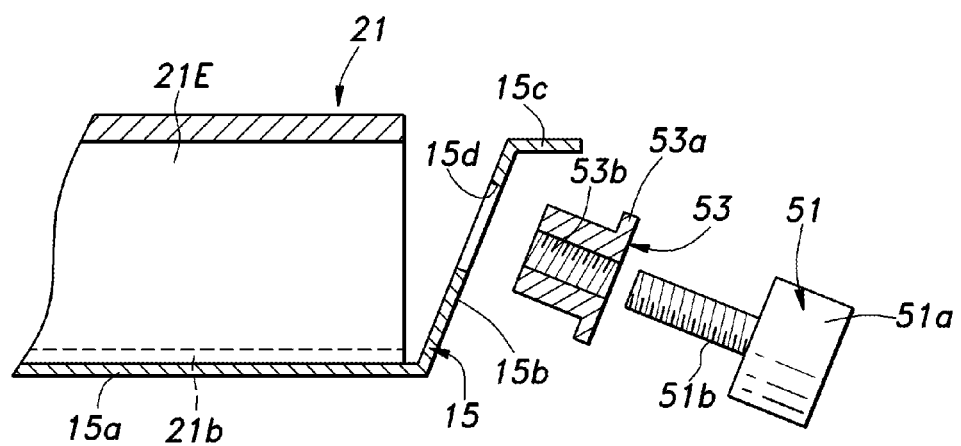
FIG. 7 is an exploded cross sectional plan view showing how the projecting member is mounted on the vehicle door structure.

As shown in FIG. 7, the end surface 15b is formed with a through hole 15d. A nut member 53 having a central threaded hole 53b and a radial flange 53a on the outer periphery thereof is received in the hole 15d with the radial flange 53a limiting the depth by which the nut member 53 is passed into the through hole 15d. A male thread 51b of a headed bolt 51 is threaded into the central threaded hole 53b of the nut member 53 from outside or from the front end. As a result, the head 51a of the headed bolt 51 projects forward from the end surface 15b, and forms a projecting member. The head 51a of the headed bolt 51 is referred to as "projecting member" in the following description.

It is important to note that the projecting member 51a is located so as to align with the beam member 21 along the fore and aft direction. In other words, in a projected plane perpendicular to the fore and aft direction, the projecting member 51a overlaps with the beam member 21.

Figure 8:
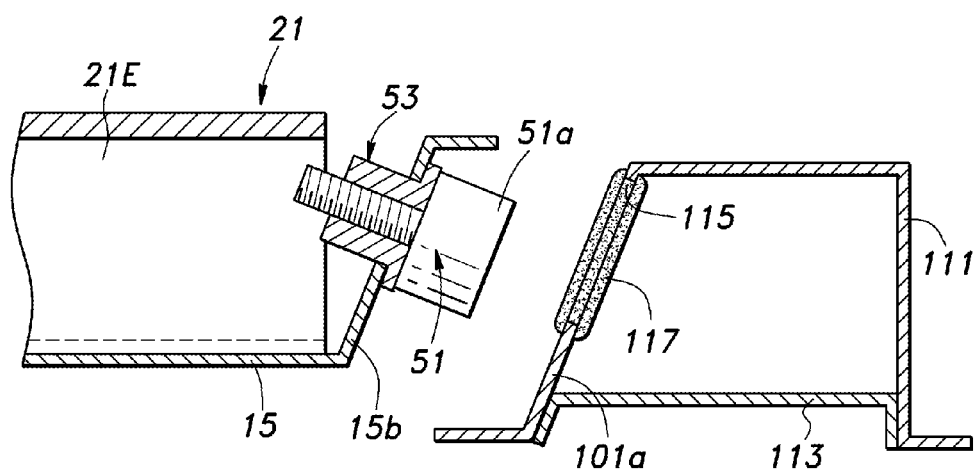
FIG. 8 is a cross sectional plan view of an essential part of the vehicle door structure prior to a frontal crash.
Figure 9:
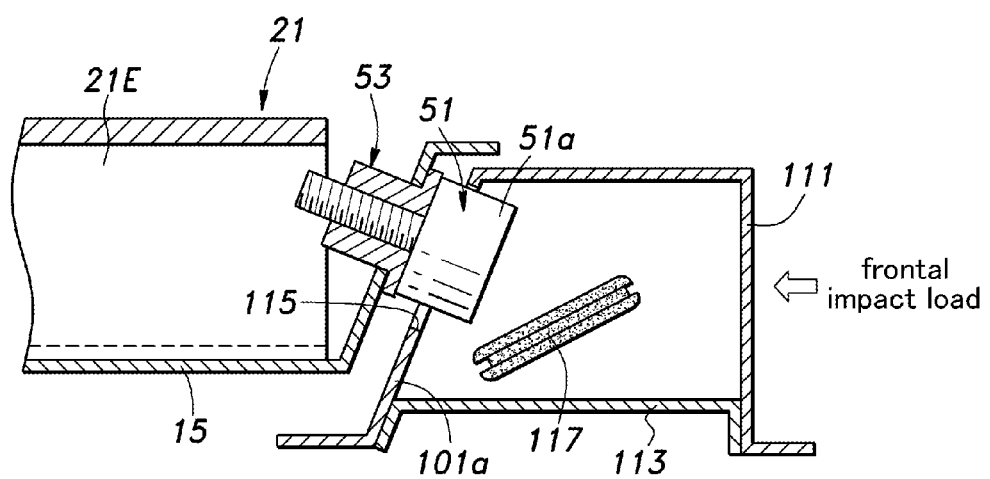
FIG. 9 is a cross sectional plan view of the essential part of the vehicle door structure following a frontal crash.

As shown in FIG. 8, an engagement hole 115 is passed through a part of the rear surface 111a of the A pillar lower member 111 facing the projecting member 51a. The engagement hole 115 is dimensioned and configured to receive the projecting member 51a when a relative displacement between the A pillar lower member 111 and the front side door 7 (inner panel 15) is caused in the fore and aft direction by a frontal crash load as shown in FIG. 9.

Once the projecting member 51a is received or lodged in the engagement hole 115, the inner panel 15 is constrained by the A pillar lower member 111, and the inner panel 15 and the A pillar lower member 111 are unable to make any relative movement (shifting) in either the lateral direction or vertical direction particularly in the area adjacent to the beam member 21.

As can be readily appreciated, prior to the occurrence of the frontal crash, as shown in FIG. 8, the projecting member 51a is spaced away from the rear surface 111a of the A pillar lower member 111 without interfering with the A pillar lower member 111 so that the opening and closing of the front side door 7 is not in any obstructed by the projecting member 51a.

The engagement hole 115 is normally closed by a rubber plug 117 fitted on the A pillar lower member 111 for protecting the intrusion of foreign matter or moisture into the A pillar lower member 111. When the projecting member 115 abuts the rubber plug 117 in the process of the projecting member 115 being received by the engagement hole 115, the rubber plug 117 is dislodged from the A pillar lower member 111 so as not to obstruct the projecting member 51a from being received by the engagement hole 115.

Thereby, the beam member 21 can be positioned relative to the A pillar lower member 111 as initially designed so that the beam member 21 is allowed to perform its function as initially designed with a high efficiency. In the illustrated embodiment, the transmission of the frontal crash load from the A pillar lower member 111 to the beam member 21 occurs through the path of the A pillar member 111-the bracket 27-the front part of the door sash 17-the beam member 21.

A stiffener 113 is attached to the A pillar lower member 111 so as to jointly define an A pillar having a closed cross section.

As the beam member 23 does not have a closed cross section, and includes the S shaped cross section member 21C, the beam member 23 is enabled to collapse into a completely flat configuration so that the energy of a side crash can be absorbed in a highly efficient manner.

The beam member 21 is provided with six bent ridge lines a to f owing to the inclusion of the S shaped cross section member 21C so that the whole part of the beam member 21 is enabled to effectively function as a load path member of the front side door 7 for the fore and aft loading. In the illustrated embodiment, the fact that the bent ridge lines a and b extend straight in the fore and aft direction allows the beam member 21 to most effectively function as a load path member. The bent ridge lines c to f are not straight, but the front and rear parts of each of these ridge lines are smoothly connected to each other via the vertically slanted curved section 21Em. These curved ridge lines allow the beam member 21 to function as a load path member in a more effective manner as compared with the case where the bent ridge lines crank in the fore and aft direction. As the vertical width of the S shaped cross section member 21C is enlarged in the front part of the door, the front crash load that is applied to the front pillar lower member 111 can be supported over a wide area, and localized deformation of the front pillar lower member 111 can be avoided.

The transmission path of the frontal crash load from the A pillar lower member 111 and the beam member 21 can be laterally adjusted by properly selecting the channel depth of the S shaped cross section member 21C of the beam member 21, and in particular by properly selecting the channel depth of the lower C shaped channel section 21E, and vertically adjusted by selecting the downward offset of the lower C shaped channel section 21E. Thereby, with the additional selection of the position of the projecting member 51a, the transmission path of the frontal crash load from the A pillar lower member 111 and the beam member 21 can be optimally selected so that the load transmission efficiency (load path efficiency) by the beam member 21 can be optimized.

In particular, the use of the beam member 21 allows the transmission path of the frontal crash load to be moved laterally inward so that the transmission path is formed as a highly straight line, and this also contributes to the improvement in the load path efficiency.

Figure 10:
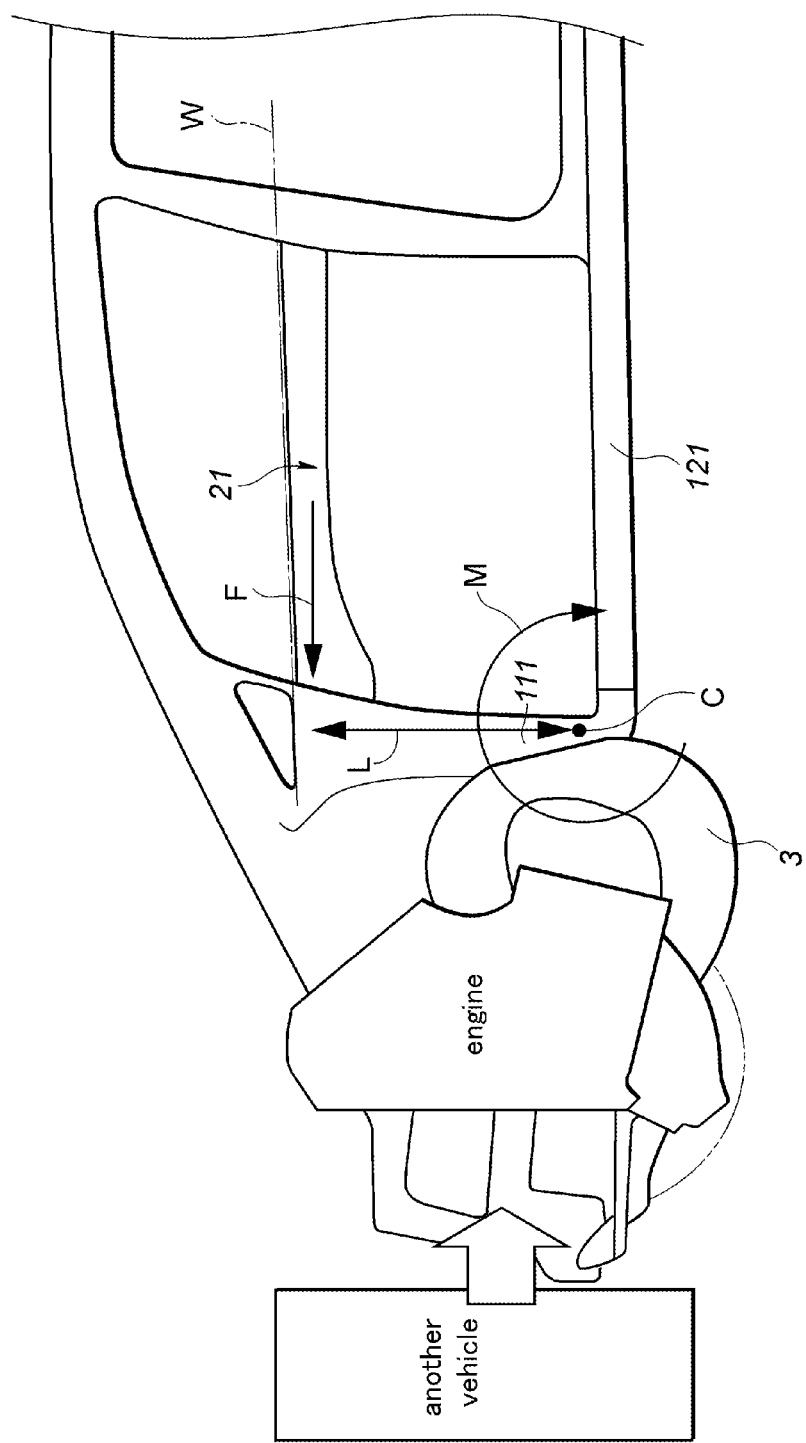
FIG. 10 is a diagram depicting a frontal crash condition.

As shown in FIG. 10, in case of a frontal crash, the frontal crash load is primarily applied to a middle part or an entire part of the front pillar lower member 111. Therefore, a bending moment M is produced around the connecting point (center of moment C) between the lower end of the front pillar lower member 111 and the front end of the side sill 21. In this connection, because the upper C shaped channel section 21D, in particular the bent ridge lines a and b of the upper C shaped channel section 21D are located adjacent to and along the lower edge W of the window opening, the upper C shaped channel section 21D is located significantly spaced away from the center of moment C of the bending moment M produced by the frontal crash.

The equilibrium between the bending moment M and the reaction force opposing the bending moment M is given by M=L·F where L is the distance (moment arm length) between the center of moment C and the point at which the bending moment is supported. Therefore, the upper C shaped channel section 21D which is located significantly spaced away from the center of moment C is able to support the bending moment M produced by a frontal crash with a relatively small reaction force. Also, because the bent ridge lines a and b extend linearly straight in the fore and aft direction along the lower edge W of the window opening, the beam member 21 is enabled to produce the reaction force F in a highly efficient manner. These factors ensure the prevention of the deformation of the front side door 7 in spite of the application of the bending moment M.

As the projecting member 51a advances into the engagement hole 115, and this prevents the inner panel 15 and the A pillar lower member 111 from moving laterally or vertically in the area adjacent to the beam member 21, it is ensured that the lower C shaped channel section 21E is located at a same elevation as the upper door hinge 33 that connects the front side door 7 to the vehicle body at the front end 21Ef of the beam member 21.

As the lower C shaped channel section 21E of the beam member 21 is located at a same elevation as the upper door hinge 33 that connects the front side door 7 to the vehicle body at the front end 21Ef of the beam member 21, the fore and aft load of a frontal crash is directly transmitted from the upper door hinge 33 to the beam member 21 as a fore and aft axial force. Thereby, the fore and aft axial load of the frontal crash is favorably transmitted to the rear part of the vehicle body via the beam member 21 serving as a load path member, and the deformation of the front side door 7 can be prevented in a reliable manner.

As the main part of the beam member 21 consists of the S shaped cross section member 21C, the lateral offset between the point at which the fore and aft axial load is applied to the front side door 7 at the time of a frontal crash from the centroid A of the beam member 21 can be minimized, or may even be reduced to zero. As a result, the lateral bending moment that may be otherwise created in the beam member 21 owing to the fore and aft axial load can be reduced, or can even be eliminated so that the transmission efficiency of the fore and aft axial load at the time of a frontal crash from the A pillar to the B pillar can be improved.

This action is also enhanced by the fact that the projecting member 51a advances into the engagement hole 115 in such a manner that the inner panel 15 and the A pillar lower member 111 are prevented from moving laterally or vertically relative to each other in the area adjacent to the beam member.

As the lower C shaped channel section 21E is located adjacent to the lower edge W of the window opening in the rear part of the vehicle body, and downwardly offset to a same elevation as the upper door hinge 33 in the front part of the vehicle body, the effective volume of the door internal space 23 is increased as compared with the case where the entire lower C shaped channel section 21E is disposed horizontally at the same elevation as the upper door hinge 33, so that the freedom in the layout of the window regulator 37, the door lock device 41 and other components required to be received in the door can be increased.

As the beam member 21 is attached to the connecting part 15A of the inner panel 15 as an extension of the inner panel 15, the upper edge of the inner panel 15 consists solely of the beam member 21 so that there is no overlap between the inner panel 15 and the beam member 21 except for the welding portion defined by the connecting part 15A of the inner panel 15 and the lower connecting part 21B of the beam member 21. Therefore, the material cost can be minimized, and the overall weight of the door can be reduced.

Figure 4:
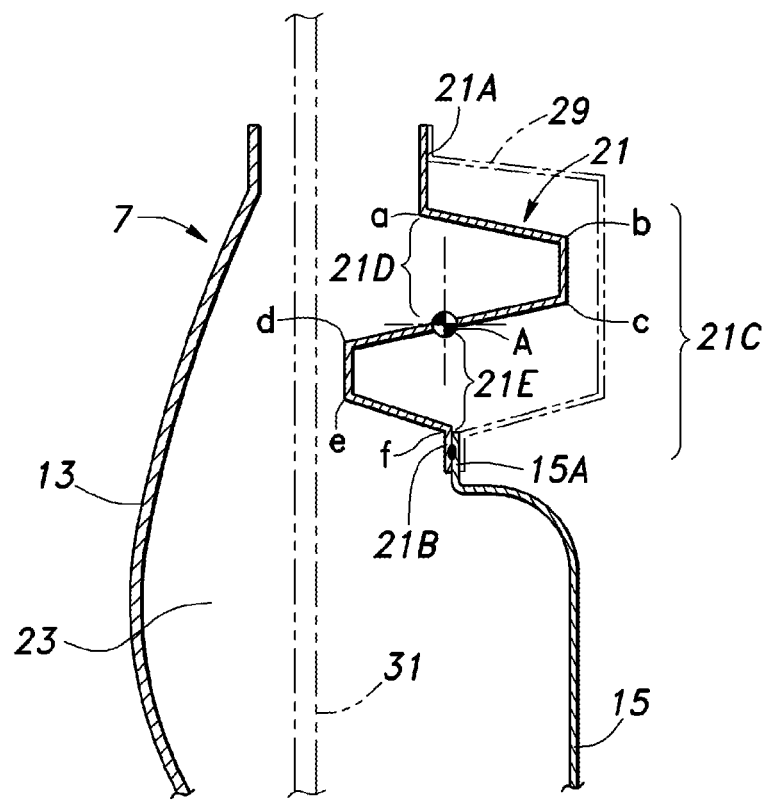
FIG. 4 is an enlarged cross sectional view taken along line IV-IV of FIG. 2.
Figure 5:
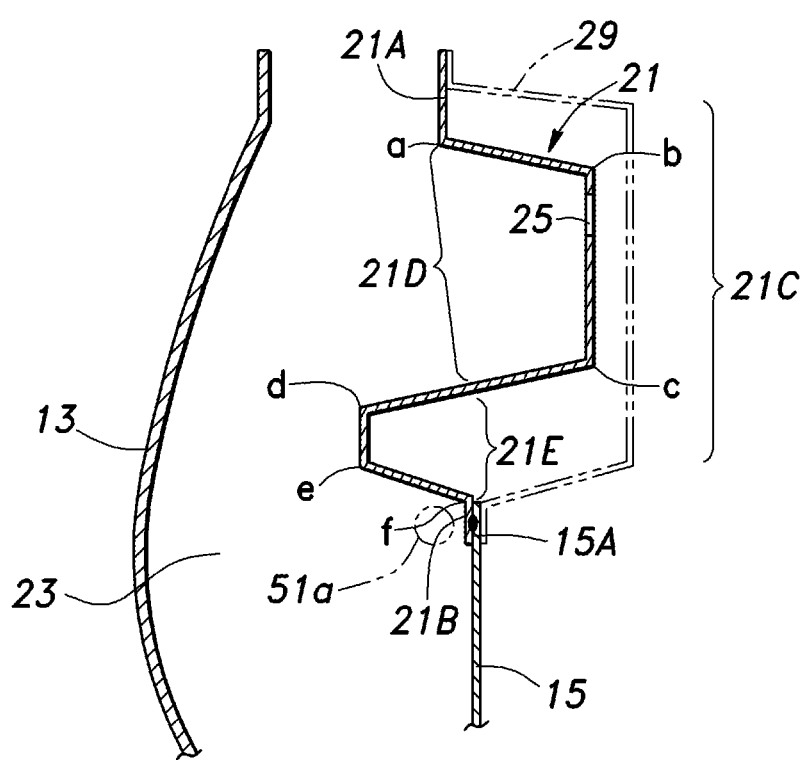
FIG. 5 is an enlarged cross sectional view taken along line V-V of FIG. 2.
Figure 6:
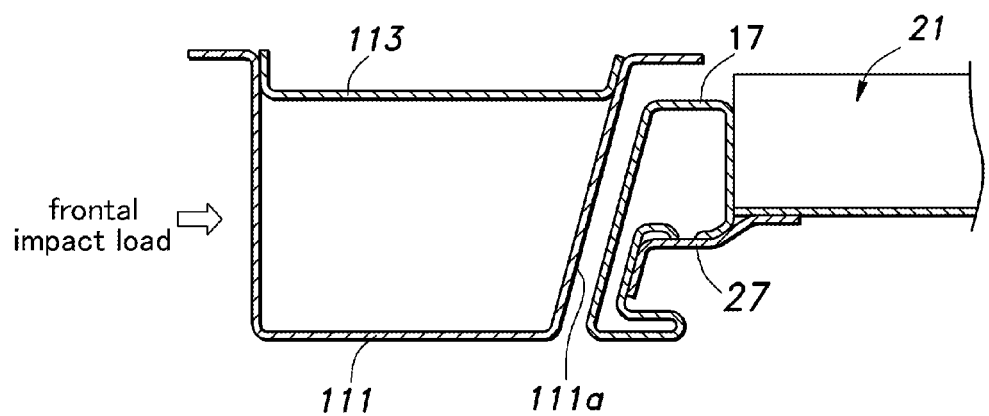
FIG. 6 is an enlarged cross sectional view taken along line VI-VI of FIG. 2.

As shown by the imaginary lines in FIGS. 4 and 5, an inner cover panel 29 having a rectangular C shaped cross section may be provided on the inboard side of the beam member 21. The inner cover panel 29 forms a closed cross section in cooperation with the S shaped cross section member 21C, and not only prevents intrusion of rainwater and other foreign matters into the passenger compartment but also reduces the passenger compartment noises that may be generated by the interaction between the access holes 25 and air flow.

The inner cover panel 29 may function as a load path member, but may also be configured not to function as a load path member. In the latter case, the inner cover panel 29 may be formed by steel sheet having a smaller thickness than the beam member 21 or by a molded plastic member.

Although the present invention has been described in terms of a preferred embodiment thereof, it is obvious to a person skilled in the art that various alterations and modifications are possible without departing from the scope of the present invention which is set forth in the appended claims.

The contents of the original Japanese patent application on which the Paris Convention priority claim is made for the present application are incorporated in this application by reference.

GLOSSARY 1 vehicle body
2 front side door
13 outer panel
15 inner panel
17 door sash
19 door window opening
21 door beam
21C S shaped cross section member
21D upper C shaped channel section
21De enlarged bottom
21E lower C shaped channel section
21Em curved section
25 access hole
29 inner cover panel
33 upper door hinge
51*a* projecting member (head of headed bolt)
53*a* clip member
111 pillar lower member
115 engagement hole

The invention claimed is:

1. A vehicle door structure comprising:
an outer panel disposed on an outboard side;
an inner panel disposed on an inboard side; and
a beam member attached to the inner panel so as to extend in a fore-and-aft direction of a vehicle body, wherein:
a cross section of the beam member comprises an S-shaped cross section part;
the S-shaped cross section part is formed by a pair of channel sections each having a C-shaped cross section with a convex side thereof facing sideways, the two channel sections being connected one above the other in a mutually laterally reversed configuration; and
at least one access hole is formed in a part of a vertically extending portion of one of the two channel sections of the beam member that is vertically enlarged than another part of the vertically extending portion adjacent thereto in the fore-and-aft direction, the at least one access hole being formed so as not to cross any of ridge lines defined by the pair of channel sections.

2. The vehicle door structure according to claim 1, wherein the at least one access hole includes a plurality of access holes that overlap each other in the fore-and-aft direction.

3. The vehicle door structure according to claim 1, further comprising a hinge allowing the door structure to be opened and closed with respect to the vehicle body, wherein a lower one of the pair of channel sections is positioned at an elevation substantially the same as that of the hinge in a vicinity of the hinge.

4. The vehicle door structure according to claim 3, wherein a lowermost ridge line defined by an upper one of the pair of channel sections and an uppermost ridge line defined by a lower one of the pair of channel sections are positioned at elevations substantially the same as that of the hinge in a vicinity of the hinge.

5. The vehicle door structure according to claim 4, wherein each of the lowermost ridge line defined by the upper one of the pair of channel sections and the uppermost ridge line defined by the lower one of the pair of channel sections includes a substantially horizontally extending part in a front part of the door structure.

6. The vehicle door structure according to claim 5, wherein the substantially horizontally extending part is positioned in front of a window regulator provided in the door structure for moving up and down a glass windshield.

7. The vehicle door structure according to claim 1, wherein the part of the vertically extending portion of the beam member that is vertically enlarged is provided in an upper one of the pair of channel sections, and the access hole provides an access to the outer panel from inside the vehicle body when attaching a door mirror to the outer panel.

8. The vehicle door structure according to claim 1, further comprising an inner cover panel provided on an inboard side of the inner panel, wherein the inner cover panel, the inner panel and the beam member are attached to one another at a same position.

9. The vehicle door structure according to claim 1, wherein a rear end of the beam member is attached to a door sash.

* * * * *